UNITED STATES PATENT OFFICE.

LEVI S. FALES, OF NEW YORK, N. Y.

IMPROVEMENT IN THE MANUFACTURE OF FERTILIZERS.

Specification forming part of Letters Patent No. 78,730, dated June 9, 1868.

*To all whom it may concern:*

Be it known that I, LEVI S. FALES, of the city, county, and State of New York, have invented certain new and useful Improvements in the Manufacture of Fertilizers; and I do hereby declare that the following is a full, clear, and exact description of the same.

The object of this invention is to obtain a cheap and highly-ammoniated manure, the fertilizing properties of which shall greatly exceed the artificial fertilizers hitherto introduced; and to this end the invention consists in a novel process of preparing the bones or equivalent highly-nitrogenized material, which constitutes an essential ingredient of the manure, whereby such preparation is rendered very economical, and whereby any waste of ammonia from the material is effectually prevented, thereby securing, in part, the object mentioned; and, furthermore, the invention consists in a novel combination of ingredients, whereby the manure is brought to the desired standard of value and utility.

To enable others to understand the nature of my invention, I will proceed to describe it.

In the manufacture of my fertilizer, I fill a boiler of any suitable kind with the waste ammoniacal water of gas-factories, and connect such boiler, by a suitable pipe, with a closed vessel or tank containing raw bones, blood, scraps of leather, or other like highly-nitrogenized materials, to which I add waste acid from oil-refineries, in about the proportion of seven hundred pounds of the waste acid to a ton of the material just named.

On the application of heat to the boiler, ammoniacal vapors are caused to pass over to the vessel, and, combining with the acid therein, form sulphate of ammonia, simultaneously with which the nitrogenized material is found to be dissolved to a pasty consistency, about ten or twelve hours being required to reduce the mass to this condition, which having been accomplished, the surplus or supernatant liquor is drawn off therefrom, and the mass, being then suffered to cool, assumes the form of a comparatively fine powder. I then take blood, prepared by digesting about eight hundred pounds of blood, in the condition in which it is commonly obtained from the slaughter-houses, with one hundred pounds of ordinary sulphuric acid, diluted with one-half its weight of water, and add the blood thus prepared to the powdered mass just hereinbefore described, and, after thoroughly mixing the whole, incorporate therewith about three times its weight of peat, or, in lieu thereof, of sea-sand.

It will be noticed that by the process herein set forth of preparing the bones or like highly-nitrogenized material, only a few hours are required to reduce such material to the required condition, whereas, by the ordinary method, a very much longer period is required to secure this result; and, furthermore, that the chief reducing agents—to wit, the ammoniacal water and the acid—being not only waste products, and consequently of little value in their original condition, but combining to form a highly-fertilizing compound, not only render the preparation of the highly-nitrogenized material very inexpensive, but also add, in a high degree, to the manurial properties thereof; and, more than this, it should be observed that inasmuch as the bones or like material are not subjected to any drying operation, it follows that the loss of ammonia incident to the evaporation of moisture therefrom is effectually provided against, while, further, from the nature of the other ingredients, the fertilizing powers of the compound are materially increased, and the waste of ammonia therefrom after the manufacture is completed is effectually guarded against.

What I claim as my invention, and desire to secure by Letters Patent, is—

1. The within-described process of preparing the bones or equivalent highly-nitrogenized substances previous to their admixture with other materials, substantially as herein set forth.

2. The manure composed of the several materials set forth, combined in the manner and in about the proportions herein specified.

LEVI S. FALES.

Witnesses:
A. LE CLERC,
E. P. TRACY.